(12) United States Patent
Smith et al.

(10) Patent No.: US 11,037,039 B2
(45) Date of Patent: *Jun. 15, 2021

(54) METHOD AND SYSTEM FOR SECURING A TRACKING DEVICE TO A COMPONENT

(71) Applicant: S.P.M. Flow Control, Inc., Fort Worth, TX (US)

(72) Inventors: Preston Cray Smith, Dallas, TX (US); Ronnie Dwaine Phelps, Dallas, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/512,313

(22) PCT Filed: May 20, 2016

(86) PCT No.: PCT/US2016/033442
§ 371 (c)(1),
(2) Date: Mar. 17, 2017

(87) PCT Pub. No.: WO2016/187503
PCT Pub. Date: Nov. 24, 2016

(65) Prior Publication Data
US 2017/0249543 A1 Aug. 31, 2017

Related U.S. Application Data

(60) Provisional application No. 62/263,358, filed on Dec. 4, 2015, provisional application No. 62/164,766, filed on May 21, 2015.

(51) Int. Cl.
*G06K 19/07* (2006.01)
*G06K 19/077* (2006.01)
(Continued)

(52) U.S. Cl.
CPC ......... *G06K 19/0723* (2013.01); *G06F 1/181* (2013.01); *G06K 19/005* (2013.01);
(Continued)

(58) Field of Classification Search
CPC ............ E05B 73/0017; E05B 73/0029; G06K 19/07758; G06K 19/07762; G06K 19/005;
(Continued)

(56) References Cited

U.S. PATENT DOCUMENTS 2,007,203 A 7/1935 Kraeft
2,191,782 A 2/1940 Valane
(Continued)

FOREIGN PATENT DOCUMENTS

AR 84750 11/2012
AU 2011245111 A1 11/2012
(Continued)

OTHER PUBLICATIONS

Canadian Office Action dated Jun. 4, 2015, by the CIPO, re App No. 2797081.
(Continued)

*Primary Examiner* — Suezu Ellis
(74) *Attorney, Agent, or Firm* — Wei Wei Jeang; Grable Martin Fulton PLLC

(57) ABSTRACT

A carrier for securing a tracking component includes a housing. The housing includes a recess formed into a face of the housing that is adapted to secure the tracking component. The recess includes a wall that surrounds a periphery of the recess and a hole formed through a bottom surface of the recess.

12 Claims, 15 Drawing Sheets

(51) Int. Cl.
*G06Q 10/08* (2012.01)
*G06F 1/18* (2006.01)
*G06K 19/00* (2006.01)
*G06K 19/02* (2006.01)

(52) U.S. Cl.
CPC ..... *G06K 19/022* (2013.01); *G06K 19/07775* (2013.01); *G06Q 10/0833* (2013.01)

(58) Field of Classification Search
CPC ........ G06K 2017/0045; G08B 13/1463; G08B 13/2417; G08B 13/2434; G08B 21/0288; G08B 21/0291
USPC ....................................... 235/492; 340/572.8
See application file for complete search history.

(56) References Cited

U.S. PATENT DOCUMENTS

| | | | |
|---|---|---|---|
| 3,331,385 A | 7/1967 | Taylor | |
| 3,465,572 A | 9/1969 | Covert | |
| 3,742,756 A | 7/1973 | Seager | |
| 3,808,879 A | 5/1974 | Rogers | |
| 4,044,833 A | 8/1977 | Volz | |
| 4,185,802 A | 1/1980 | Myles et al. | |
| 4,329,925 A | 5/1982 | Hane et al. | |
| 4,432,064 A | 2/1984 | Barker et al. | |
| 4,574,880 A | 3/1986 | Handke | |
| 4,866,607 A | 9/1989 | Anderson et al. | |
| 4,916,641 A | 4/1990 | Bybee | |
| 5,063,775 A | 11/1991 | Walker, Sr. et al. | |
| 5,105,881 A | 4/1992 | Thoms et al. | |
| D326,927 S | 6/1992 | Catalina | |
| 5,269,180 A | 12/1993 | Dave et al. | |
| 5,360,967 A | 11/1994 | Perkin et al. | |
| 5,372,195 A | 12/1994 | Swanson et al. | |
| 5,377,104 A | 12/1994 | Sorrells et al. | |
| D354,677 S | 1/1995 | Troyer | |
| D365,927 S | 1/1996 | Cho | |
| D368,218 S | 3/1996 | Klein, III | |
| 5,509,303 A | 4/1996 | Georgi | |
| D371,370 S | 7/1996 | Fenton et al. | |
| 5,627,520 A | 5/1997 | Grubbs et al. | |
| 5,722,490 A | 3/1998 | Ebinger | |
| D406,590 S | 3/1999 | Heiligenstein et al. | |
| D408,269 S | 4/1999 | Ross | |
| D408,716 S | 4/1999 | Vesledahl | |
| 6,123,394 A | 9/2000 | Jeffrey | |
| 6,346,886 B1 | 2/2002 | De La Huerga | |
| 6,434,500 B1 | 8/2002 | Boehne et al. | |
| 6,452,497 B1 | 9/2002 | Finlayson | |
| 6,457,529 B2 | 10/2002 | Calder et al. | |
| 6,480,100 B1 | 11/2002 | Frieden et al. | |
| 6,494,305 B1* | 12/2002 | Black ................... | A22B 5/0064 198/349 |
| 6,567,752 B2 | 5/2003 | Cusumano et al. | |
| 6,592,822 B1 | 7/2003 | Chandler | |
| 6,597,175 B1 | 7/2003 | Brisco | |
| 6,648,606 B2 | 11/2003 | Sabini et al. | |
| D492,670 S | 7/2004 | Hung et al. | |
| D495,223 S | 8/2004 | Altman | |
| 6,820,694 B2 | 11/2004 | Willberg et al. | |
| 6,829,542 B1 | 12/2004 | Reynolds et al. | |
| 6,831,571 B2 | 12/2004 | Bartel | |
| 6,922,641 B2 | 7/2005 | Batzinger et al. | |
| 6,989,764 B2 | 1/2006 | Thomeer et al. | |
| 7,064,668 B2 | 6/2006 | Porad | |
| 7,069,776 B2 | 7/2006 | Tudor | |
| D527,378 S | 8/2006 | Raymond et al. | |
| 7,083,391 B2 | 8/2006 | Sievert et al. | |
| 7,096,718 B2 | 8/2006 | Matzner et al. | |
| 7,096,961 B2 | 8/2006 | Clark et al. | |
| 7,137,451 B2 | 11/2006 | Smith | |
| D535,982 S | 1/2007 | Inoue | |
| 7,159,654 B2 | 1/2007 | Ellison et al. | |
| D538,630 S | 3/2007 | Sergi | |
| 7,239,977 B2 | 7/2007 | Fantana et al. | |
| 7,242,317 B2 | 7/2007 | Silvers | |
| 7,259,675 B2 | 8/2007 | Baker et al. | |
| D551,662 S | 9/2007 | Buren et al. | |
| 7,267,798 B2 | 9/2007 | Chandler | |
| 7,272,529 B2 | 9/2007 | Hogan et al. | |
| 7,301,474 B2 | 11/2007 | Zimmerman | |
| 7,308,331 B2 | 12/2007 | Bjornson | |
| 7,383,882 B2 | 6/2008 | Lerche et al. | |
| 7,389,870 B2 | 6/2008 | Slappay | |
| D573,589 S | 7/2008 | Montgomery et al. | |
| 7,395,188 B1 | 7/2008 | Goebel et al. | |
| 7,400,263 B2 | 7/2008 | Snider et al. | |
| 7,412,898 B1 | 8/2008 | Smith et al. | |
| D578,521 S | 10/2008 | Sergi et al. | |
| 7,433,789 B1 | 10/2008 | Balestra | |
| 7,477,160 B2 | 1/2009 | Lemenager et al. | |
| 7,484,625 B2 | 2/2009 | Scott et al. | |
| D597,086 S | 7/2009 | Sergi et al. | |
| 7,557,716 B2 | 7/2009 | Morbitzer et al. | |
| D598,274 S | 8/2009 | Nerskov | |
| 7,579,950 B2 | 8/2009 | Lerch et al. | |
| 7,603,296 B2 | 10/2009 | Whiteley et al. | |
| 7,606,682 B2 | 10/2009 | Denny et al. | |
| D603,383 S | 11/2009 | Nyalamadugu et al. | |
| 7,619,523 B2 | 11/2009 | Durtschi et al. | |
| D607,442 S | 1/2010 | Su et al. | |
| 7,657,468 B1 | 2/2010 | Whiteley et al. | |
| 7,664,685 B1 | 2/2010 | Whiteley et al. | |
| 7,684,936 B2 | 3/2010 | Bechhoefer | |
| D620,483 S | 7/2010 | Conrad et al. | |
| 7,819,182 B2 | 10/2010 | Adamek | |
| 7,823,640 B2 | 11/2010 | Flanders | |
| 7,832,258 B2 | 11/2010 | Mudge et al. | |
| 7,849,619 B2 | 12/2010 | Mosher, Jr. et al. | |
| 7,893,832 B2 | 2/2011 | Laackmann | |
| 7,912,678 B2 | 3/2011 | Denny et al. | |
| 7,928,922 B2 | 4/2011 | King | |
| D651,591 S | 1/2012 | Hunter et al. | |
| D651,592 S | 1/2012 | Hunter et al. | |
| D651,593 S | 1/2012 | Hunter et al. | |
| 8,116,990 B2 | 2/2012 | Koul | |
| 8,120,497 B2 | 2/2012 | Binmore | |
| D655,081 S | 3/2012 | Maravilla et al. | |
| 8,289,173 B2 | 10/2012 | Ben-Mansour et al. | |
| 8,485,448 B2 | 7/2013 | Maizlin et al. | |
| D690,687 S | 10/2013 | Sun et al. | |
| D713,825 S | 9/2014 | Witkowski et al. | |
| 8,857,683 B2 | 10/2014 | Cameron et al. | |
| 8,985,156 B2 | 3/2015 | Drouin et al. | |
| D726,702 S | 4/2015 | Umlauf | |
| D731,171 S | 6/2015 | Upchurch et al. | |
| 10,102,471 B2* | 10/2018 | Ward ............... | G06K 19/07775 |
| 2001/0047283 A1 | 11/2001 | Melick et al. | |
| 2002/0003477 A1 | 1/2002 | Roy | |
| 2002/0158120 A1 | 10/2002 | Zierolf | |
| 2003/0076662 A1 | 4/2003 | Miehling | |
| 2003/0139982 A1 | 7/2003 | Schwartz et al. | |
| 2003/0192690 A1 | 10/2003 | Carlson et al. | |
| 2003/0209133 A1 | 11/2003 | Greenfield et al. | |
| 2004/0051368 A1 | 3/2004 | Caputo et al. | |
| 2004/0052202 A1 | 3/2004 | Brollier | |
| 2004/0074974 A1* | 4/2004 | Senba ................... | G06K 19/041 235/492 |
| 2004/0078306 A1 | 4/2004 | Whiteley et al. | |
| 2004/0088115 A1 | 5/2004 | Guggari et al. | |
| 2004/0107823 A1 | 6/2004 | Kiley et al. | |
| 2005/0087235 A1 | 4/2005 | Skorpik et al. | |
| 2006/0022056 A1 | 2/2006 | Sakama et al. | |
| 2006/0028344 A1 | 2/2006 | Forster | |
| 2006/0043199 A1 | 3/2006 | Baba et al. | |
| 2006/0049949 A1* | 3/2006 | Jurs ....................... | A22B 7/002 340/572.8 |
| 2006/0076419 A1 | 4/2006 | Johnson | |
| 2007/0009097 A1 | 1/2007 | Badger et al. | |
| 2007/0018825 A1 | 1/2007 | Morbitzer et al. | |
| 2007/0042820 A1 | 2/2007 | Cloonan | |
| 2007/0096920 A1* | 5/2007 | Cargonja ............... | G08B 25/10 340/572.8 |

(56) References Cited

U.S. PATENT DOCUMENTS

| | | | |
|---|---|---|---|
| 2007/0124220 A1 | 5/2007 | Griggs et al. | |
| 2007/0159336 A1 | 7/2007 | Tethrake et al. | |
| 2007/0171075 A1 | 7/2007 | Ryu | |
| 2007/0181726 A1 | 8/2007 | Ishikawa et al. | |
| 2007/0226487 A1 | 9/2007 | Li | |
| 2007/0285258 A1 | 12/2007 | Hartman | |
| 2008/0009149 A1 | 1/2008 | Arms et al. | |
| 2008/0009185 A1 | 1/2008 | Knoll et al. | |
| 2008/0029541 A1 | 2/2008 | Wallace et al. | |
| 2008/0252459 A1 | 10/2008 | Butler et al. | |
| 2009/0006153 A1 | 1/2009 | Greiner et al. | |
| 2009/0055293 A1 | 2/2009 | Mueller | |
| 2009/0058610 A1 | 3/2009 | Krebs et al. | |
| 2009/0112308 A1 | 4/2009 | Kassem | |
| 2009/0121895 A1 | 5/2009 | Denny et al. | |
| 2009/0188675 A1 | 7/2009 | Bloom et al. | |
| 2009/0205820 A1 | 8/2009 | Koederitz et al. | |
| 2009/0208295 A1 | 8/2009 | Kinert et al. | |
| 2009/0307763 A1 | 12/2009 | Rawlins et al. | |
| 2010/0051286 A1 | 3/2010 | McStay et al. | |
| 2010/0096455 A1 | 4/2010 | Binmore | |
| 2010/0123586 A1 | 5/2010 | Baba et al. | |
| 2010/0326219 A1* | 12/2010 | Nelson | B65D 63/00 73/865.8 |
| 2011/0052423 A1 | 3/2011 | Gambier et al. | |
| 2011/0060568 A1 | 3/2011 | Goldfine et al. | |
| 2011/0139877 A1 | 6/2011 | Szakelyhidi et al. | |
| 2011/0233283 A1 | 9/2011 | Hansen | |
| 2011/0240747 A1 | 10/2011 | Stewart et al. | |
| 2011/0253793 A1* | 10/2011 | King | G06K 19/07728 235/492 |
| 2011/0270525 A1 | 11/2011 | Hunter | |
| 2011/0273296 A1 | 11/2011 | Laase et al. | |
| 2012/0061091 A1 | 3/2012 | Radi | |
| 2013/0209277 A1 | 8/2013 | Locke et al. | |
| 2013/0317750 A1* | 11/2013 | Hunter | G01M 99/00 702/6 |
| 2015/0105221 A1 | 4/2015 | Roush et al. | |
| 2016/0032707 A1* | 2/2016 | Bowman | G06K 7/10366 166/66 |
| 2017/0046612 A1 | 2/2017 | Ward et al. | |
| 2017/0147918 A1* | 5/2017 | Karani | G06F 16/9554 |

FOREIGN PATENT DOCUMENTS

| | | |
|---|---|---|
| AU | 346763 | 2/2013 |
| AU | 346764 | 2/2013 |
| AU | 346765 | 2/2013 |
| AU | 346766 | 2/2013 |
| CA | 1333962 C | 1/1995 |
| CA | 2486126 A1 | 10/2005 |
| CA | 2515233 C | 10/2009 |
| CA | 2604118 C | 6/2010 |
| CA | 148446 S | 8/2014 |
| CN | 1179196 A | 4/1998 |
| CN | 201035846 Y | 3/2008 |
| CN | 201142169 Y | 10/2008 |
| CN | 1920901 B | 6/2011 |
| CN | ZL201230542463 | 10/2013 |
| DE | 102009043267 A1 | 4/2011 |
| EM | ECD-002132621-0001 | 11/2012 |
| EM | ECD-002132621-0002 | 11/2012 |
| EP | 0280489 A2 | 8/1988 |
| EP | 1895452 A1 | 3/2008 |
| FR | 2936039 A1 | 3/2010 |
| FR | 2955936 A1 | 8/2011 |
| GB | 2398454 A | 8/2004 |
| GB | 2419671 A | 5/2006 |
| GB | 2475195 A | 5/2011 |
| JP | 2002352199 A | 12/2002 |
| JP | 2003035380 A | 2/2003 |
| JP | 2003139271 A | 5/2003 |
| JP | 2003185056 A | 7/2003 |
| JP | 2005181111 A | 7/2005 |
| JP | 2005335737 A | 12/2005 |
| JP | 2008033706 A | 2/2008 |
| JP | 2009083576 A | 4/2009 |
| JP | 2010152662 A | 7/2010 |
| JP | 4767148 B2 | 9/2011 |
| KR | 20100012277 A | 2/2010 |
| KR | 20120065631 A | 6/2012 |
| NO | 083874 | 3/2013 |
| PK | 16438-D | 5/2013 |
| SG | D2012/1277 F | 12/2012 |
| SG | D2012/1278 B | 12/2012 |
| TW | M305600 U | 2/2007 |
| TW | M305862 U | 2/2007 |
| WO | WO-2008012933 A1 | 1/2008 |
| WO | WO-2009089580 A1 | 7/2009 |
| WO | WO-2010018356 A2 | 2/2010 |
| WO | WO-2010086596 A1 | 8/2010 |
| WO | WO-2011137460 A2 | 11/2011 |
| WO | WO-2012094503 A2 | 7/2012 |
| WO | WO-2012119048 A2 | 9/2012 |
| WO | WO-2013177353 A2 | 11/2013 |

OTHER PUBLICATIONS

Final Office Action, dated Apr. 24, 2015, by the USPTO, re U.S. Appl. No. 13/099,307.

International Preliminary Report on Patentability, by the IPEA/US, dated Jul. 16, 2014, re PCT/US2013/042345.

International Search Report and Written Opinion, dated Nov. 23, 2011, re PCT/US2011/034863.

International Search Report and Written Opinion dated Dec. 2, 2013, by the ISA/US, re PCT/US2013/042345.

Kurita T., et al., Network Wireless Sensor for Remote Monitoring of Gas Wells, Fuji Electric Review Journal, 2006, vol. 53 (1), pp. 17-20.

Notice of Allowance dated Apr. 12, 2006, by the USPTO, re U.S. Appl. No. 10/755,456.

Notice of Allowance, dated May 16, 2014, by the USPTO, re U.S. Appl. No. 29/420,448.

Notice of Allowance dated Oct. 19, 2015, by the USPTO, re U.S. Appl. No. 29/503,568.

Notice of Allowance dated Oct. 7, 2011, by the USPTO, re U.S. Appl. No. 29/393,452.

Notice of Allowance dated Oct. 7, 2011, by the USPTO, re U.S. Appl. No. 29/393,453.

Notice of Allowance dated Oct. 7, 2011, by the USPTO, re U.S. Appl. No. 29/393,454.

Office Action dated Aug. 30, 2005, by the USPTO, re U.S. Appl. No. 10/755,456.

Office Action dated Feb. 21, 2006, by the USPTO, re U.S. Appl. No. 10/755,456.

Office Action dated Oct. 7, 2005, by the USPTO, re U.S. Appl. No. 10/755,456.

Office Action dated Sep. 17, 2013, by the USPTO, re U.S. Appl. No. 13/099,307.

Office Action dated Sep. 30, 2014, by the USPTO, re U.S. Appl. No. 13/099,307.

Schempf, Hagen, Ph.D., GasNet: Gas Main Sensor and Communications Network System, Phase 1 Topical Report, Document No. REP-GOV, DOE-020303, Work Performed by Automatika, Inc., Pittsburgh, PA15238, Feb. 27, 2003.

TROI—Home, http://www.troirfid.com, last visited Jan. 28, 2011.

Office Action dated May 18, 2017, by the USPTO, re U.S. Appl. No. 14/812,751.

Schempf, Hagen, Ph.D., GasNet: Gas Main Sensor and Communications Network System, Phase III Final Report, Document No. REP-GOV-DOE-123105, Work Performed by Automatika, Inc., Pittsburgh, PA15238, Apr. 30, 2006.

Copenheaver, Blaine R., "International Search Report," prepared for PCT/US2016/033442, dated Aug. 31, 2016, one page.

"Applying a Holland 1916 PipeTracker to a Steel Pipe"; https://www.youtube.com/watch?v=W7lppHzehYU&app=desktop; Mar. 29, 2012; 6 pages.

(56) References Cited

OTHER PUBLICATIONS

Moritis, Guntis; "Service Companies Install RFID Tags on Frac Equipment"; Oil & Gas Journal, vol. 108, Issue 23; Jun. 28, 2010; 5 pages.
Tydenbrooks; "FlexSecure FS 15"; http://tydenbrooks.com/media/catalog/product/files/FlexSecure_FS15_15V1.pdf; date unknown; 2 pages, known as of Mar. 17, 2017.

* cited by examiner

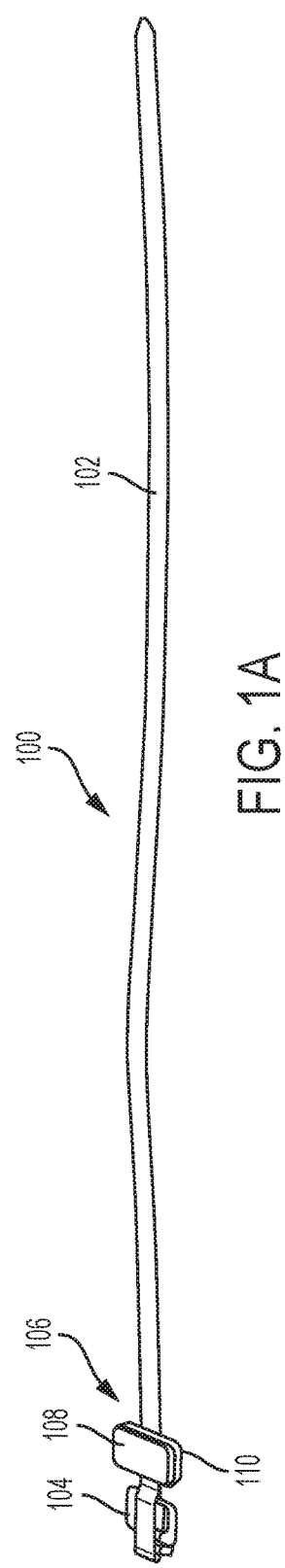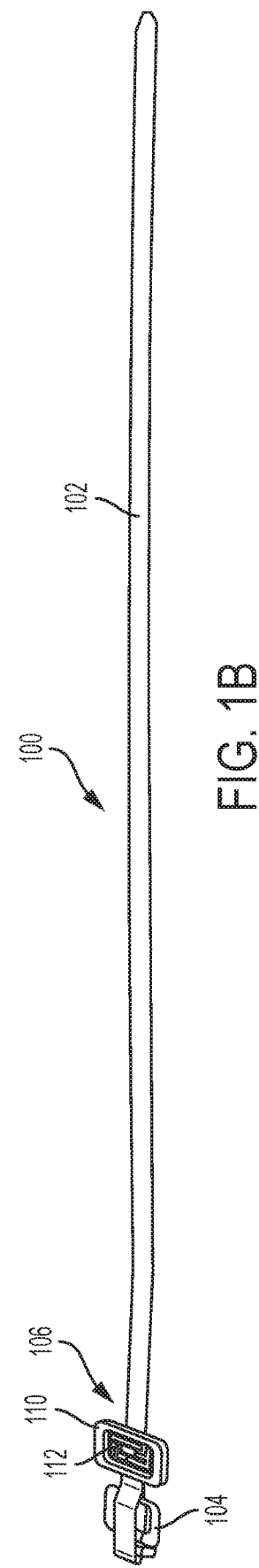

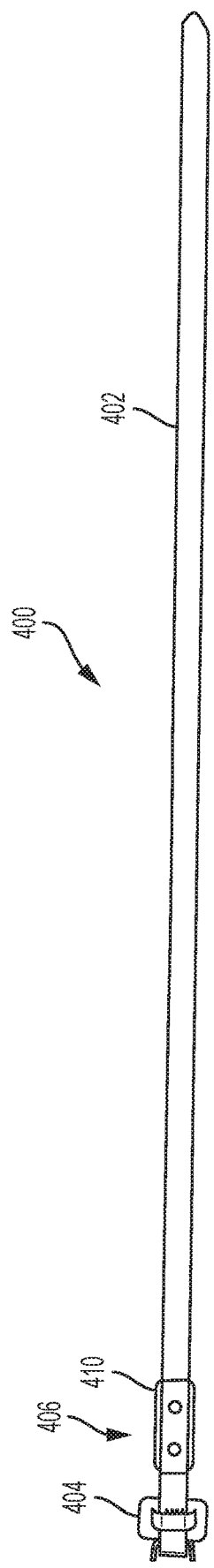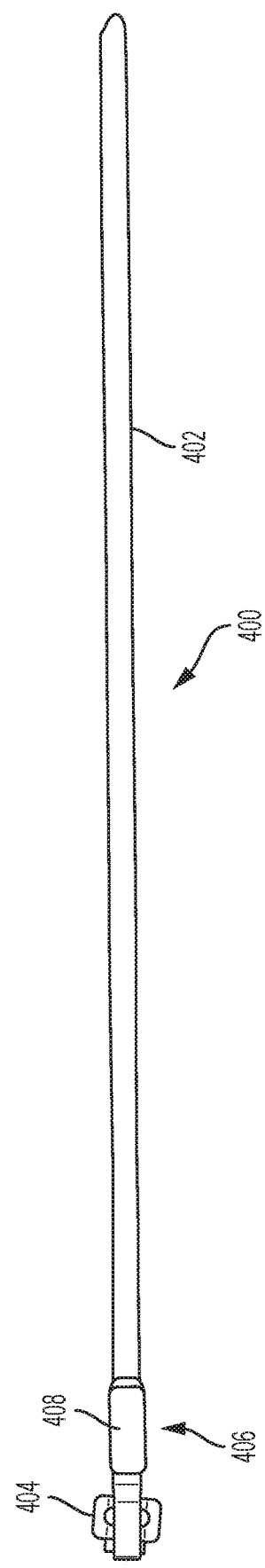

US 11,037,039 B2

METHOD AND SYSTEM FOR SECURING A TRACKING DEVICE TO A COMPONENT

This application claims the benefit of U.S. Provisional Patent Application 62/164,766, filed on May 21, 2015 and U.S. Provisional Patent Application 62/263,358, filed on Dec. 4, 2015, each of which is incorporated by reference herein in its entirety.

BACKGROUND

It is often desirable to mark or tag a component of a system to facilitate tracking or logging of data relating to the component. For example, a tag may be attached to the component so that a log can be maintained to keep track of various parameters describing the component, such as, for example, date of installation of the component, last date of maintenance or service of the component, last date of inspection, and the like. Inspecting a tag manually generally takes more time is more likely to result in the collection of erroneous data. It would be beneficial to affix a tag to the component that can be read automatically by a reader device. For example, an RFID tag that can be read by an RFID reader may be used. In some installations, the RFID tag may need to endure environmental conditions that may cause the RFID tag to fail. For example, the RFID tag may need to endure vibrations, impacts, weather conditions (e.g., heat, cold, rain, snow, and the like), and the like.

SUMMARY

A carrier for securing a tracking component includes a housing. The housing includes a recess formed into a face of the housing that is adapted to secure the tracking component. The recess includes a wall that surrounds a periphery of the recess and a hole formed through a bottom surface of the recess.

A tracking device includes a flexible band and a carrier attached to the flexible band. The carrier includes a housing with a recess formed into a face of the housing. The recess is adapted to secure a tracking component within the carrier and includes wall that surrounds a periphery of the recess. The wall includes a wall feature that results in at least a portion of the recess having a footprint that is larger than an opening of the recess.

A method of assembling a tracking device includes securing a tracking component within a recess of a housing so that at least a portion of an antenna element of the tracking component is positioned beneath a hole formed through a bottom surface of the recess. The method also includes securing the housing to an inside surface of a flexible band so that the housing can be positioned between the flexible band and a component when the tracking device is secured to the component.

A method of securing a tracking device to a component includes wrapping a flexible band of the tracking device around a portion of the component so that a housing that is secured to the flexible band and including a recess and a hole formed through the recess is positioned between the flexible band and the component. The method of securing the tracking device includes tensioning the flexible band around the portion of the component to inhibit relative movement of the tracking device and the portion of the component. The tracking device includes a tracking component secured within a recess of the housing so that at least a portion of an antenna element of the tracking component is positioned beneath the hole.

BRIEF DESCRIPTION OF THE DRAWINGS

FIG. 1A is a bottom view of a tracking device;
FIG. 1B is a bottom view of the tracking device of FIG. 1A with a cover removed;
FIG. 11A is top view of a tracking device;
FIG. 11B is a bottom view of the tracking device of FIG. 11A.

DETAILED DESCRIPTION

Figure 2:
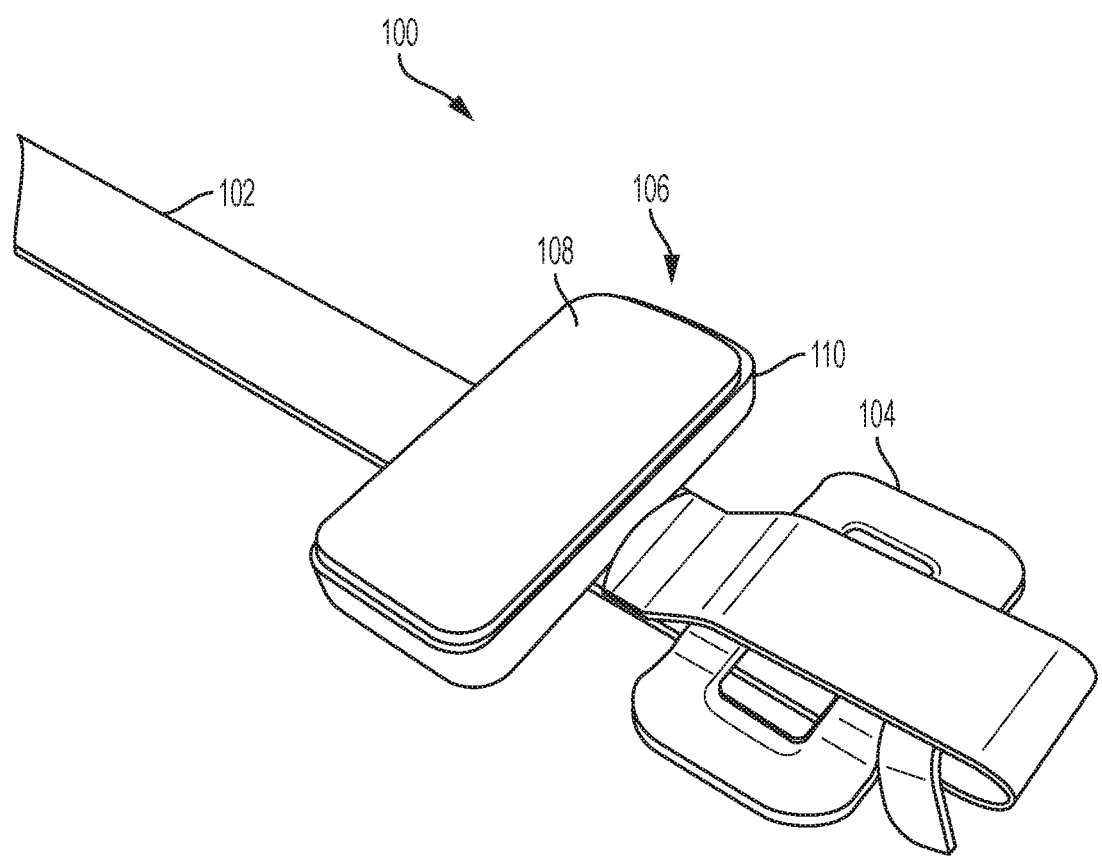
FIG. 2 is a partial perspective view of a bottom side of the tracking device of FIG. 1A.

Various embodiments of the present invention will now be described more fully with reference to the accompanying drawings. The invention may, however, be embodied in many different forms and should not be construed as limited to the embodiments set forth herein.

Referring now to FIGS. 1A and 1B, bottom views of a tracking device 100 are shown with a cover 108 installed on a housing 110 and the cover 108 removed therefrom, respectively. The tracking device 100 includes a flexible band 102 with a clasp 104 disposed at an end of the flexible band 102. The cover 108 and the housing 110 in combination are referred to as a carrier 106. The carrier 106 is adapted to house a tracking component 112 and may be attached to the flexible band 102 at any point along a length of the flexible band 102. The cover 108 is adapted to protect the housing 110 and the tracking component 112 from impacts, vibrations, and the elements.

In a typical embodiment, the flexile band 102 is a bendable piece of metal. In other embodiments, the flexible band 102 may be made of other materials as desired, such as, for example, plastics and the like. To secure the tracking device 100 to a component, the tracking device 100 is oriented with the carrier 106 facing inwards towards the component. As shown in FIGS. 1A and 1B, the carrier 106 is secured to the flexible band 102 so that a length of the carrier 106 is perpendicular to a length of the flexible band 102. In other embodiments, the carrier 106 may be oriented so that the length of the carrier 106 is parallel to the length of the flexible band 102 (e.g., see FIG. 11A). The flexible band 102 may be wrapped around the component and an end of the flexible band 102 is fed into the clasp 104. The end of the flexible band 102 may then be pulled through the clasp to tension the flexible band 102 until a desired tightness has been achieved. In a typical embodiment, the flexible band 102 is pulled taut so that the tension in the flexible band 102 pins the carrier 106 against the component and inhibits relative movement between the tracking device 100 and the component. The end of the flexible band 102 may then be pulled back in an opposite direction to the direction that the end portion of the flexible and 102 was fed into the clasp 104, which bends and deforms the flexible band 102 to effectively lock the tracking device 100 in place. Pinning the carrier 106 against the component helps retain the carrier 106 against the component—even if a connection between the carrier 106 and the flexible band 102 were to fail. The component may be any of a variety of structures or articles that a user desires to monitor. For example, the component may be a pipe, tube, piece of machinery, and the like.

In various embodiments, a length of the flexible band 102 may be varied as needed to accommodate components of various sizes. For example, for smaller components, the length of the flexible band 102 may be relatively short. For larger components, the length of the flexible band 102 may be longer. In some embodiments, once the tracking device 100 has been secured to the component, an excess portion of the flexible band 102 may be removed as desired (e.g., the excess portion may be cut off). In some embodiments, the clasp 104 may be replaced with other attachment mechanisms without altering functionality of the tracking device 100. For example, the flexible band 102 may be modified to incorporate a band clamp, buckle, snaps, and the like.

As shown in FIGS. 1A and 1B, the carrier 106 has a generally rectangular shape. In some embodiments, the shape of the carrier 106 may be determined relative to dimensions of one or more tracking components to be housed within the housing 110. In some embodiments, the carrier 106 may take on a variety of other shapes. For example, the carrier 106 may be circular, triangular, polygonal, and the like. As shown in FIG. 1B, the tracking component 112 is shown housed in the housing 110. In a typical embodiment, the tracking component 112 is secured within the housing 110 with an adhesive or an epoxy resin. The tracking component 112 may be any of a variety of devices that facilitate collection of information or data relating to a component that the tracking device 100 is secured to. For example, the tracking component 112 may be an RFID tag and the like.

In a typical embodiment, the cover 108 is adapted to be secured to the housing 110. The cover 108 covers and protects the tracking component 112 and the housing 110 from, for example, impacts and vibrations. In a typical embodiment, the housing 110 is attached to the flexible band 102 so the housing 110 is positioned between the flexible band 102 and the component that the tracking device 100 is secured to. In the embodiment shown in FIGS. 1A and 1B, the housing 110 is attached to the flexible band 102 on an opposite side of the flexible band 102 with respect to the clasp 104. The housing 110 may be secured to the flexible band 102 in various ways, such as, for example, spot welding, adhesives, fasteners, and the like. In a typical embodiment, the housing 110 is attached to the flexible band 102 so as to allow an electrical signal to be conducted between the flexible band 102 and the housing 110. Allowing an electrical signal to be conducted between the flexible band 102 and the housing 110 enables the flexible band 102 to act as an antenna element for the one or more tracking components. Using the flexible band 102 as an antenna element will be discussed in more detail below.

In a typical embodiment, the housing 110 is oriented with the long side of the housing 110 perpendicular to a length of the flexible band 102. Orientation of the housing 110 in this way facilitates attachment of the housing 110 to the flexible band 102 with a relatively small contact patch between the housing 110 and the flexible band 102 and serves to align the long side of the housing 110 with a length of the component to which the tracking device 100 is attached (e.g., see FIG. 5). A relatively small contact patch between the housing 110 and the flexible band 102 serves to reduce an amount of stress upon the joint between the housing 110 and the flexible band 102 relative to an amount of stress that would be created if the long side of housing 110 were oriented parallel to the flexible band 102. This is particularly true when the flexible band 102 is tightly coupled to the component. Reducing the stress upon the joint helps minimize a likelihood of separation of the housing 110 from the flexible band 102. Aligning the length of the housing 110 with the length of the component also helps reduce bending stress within the housing 110 when the component has a curved surface, such as, for example, a pipe or tube.

Referring now to FIG. 2, a partial perspective view of a bottom side of the tracking device 100 with the cover 108 installed is shown. As shown in FIG. 2, the carrier 106 is secured on the flexible band 102 in close proximity to the clasp 104. In other embodiments, the carrier 106 may be secured to the flexible band 102 at some other position along the length of the flexible band 102 as desired. In the embodiment of FIG. 2, the cover 108 is shown secured to the housing 110. In a typical embodiment, the cover 108 protects the one or more tracking components that are housed within the housing 110 from the elements and from vibrations and impacts. The cover 108 also serves as a seal that prevents water, debris, and the like from contacting the one or more tracking components. The cover 108 can be made of various materials, such as, for example, rubbers, plastics, polymers, and the like. In some embodiments, it is preferable for the cover 108 to be made of a material that does not inhibit the passage of electromagnetic radiation into and out of the housing 110.

Figure 3:
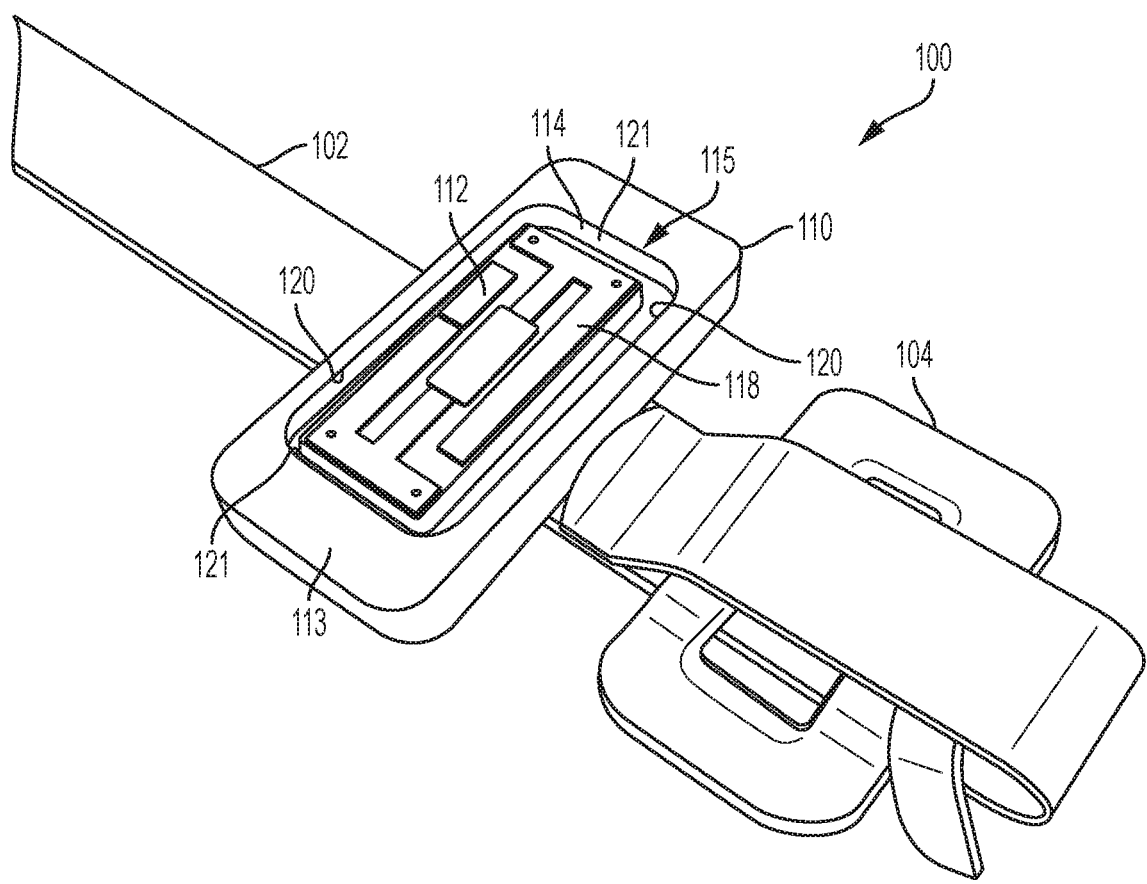
FIG. 3 is a partial perspective view of the bottom side of the tracking device of FIG. 2.

Referring now to FIG. 3, a partial perspective view of the bottom side of the tracking device 100 with the cover 108 removed is shown. In the embodiment of FIG. 3, the tracking component 112 is shown secured within a recess 114 formed into a face 113 of the housing 110. As shown in FIG. 3, the tracking component 112 is oriented within the recess 114 with an antenna element 118 facing out of the recess 114. In a typical embodiment, the tracking component 112 is retained within the housing 110 by immersing the tracking component 112 in a material, such as, for example, an epoxy resin (e.g., see FIGS. 10A and 10B). In some embodiments, the tracking component 112 is further secured within the housing 110 with an adhesive prior to adding the material to the recess 114. In a typical embodiment, the recess 114 has a depth that is greater than a thickness of the tracking component 112 so that the material the tracking component 112 is immersed in covers a top surface of the tracking component 112. Covering the top surface of the tracking component 112 helps protect the tracking component 112.

The recess 114 may be formed into the face 113 of the housing 110, for example, by various machining processes or by casting the housing 110. As shown in FIG. 3, the recess 114 has a generally rectangular shape that generally conforms to a shape of the tracking component 112. In other embodiments, the recess 114 may take on a variety of other shapes, such as, for example, circular, triangular, and the like as desired. In the embodiment shown in FIG. 3, forming the recess 114 into the housing 110 creates a pair of walls 120 and a pair of walls 121. In some embodiments, either or both of the pair of walls 120 and 121 are formed with a wall feature that results in the recess 114 having a footprint or cross-section that is larger than an opening 115 of the recess 114. In some embodiments, the wall feature is a "dovetail" shape. The dovetail shape creates walls that slope away from the opening 115 of the recess (see FIGS. 10A and 10B). Sloping one or more of the pair of walls 120 and 121 results in the opening 115 having a smaller footprint than a base of the recess 114 within the housing 110. Forming the walls of the recess 114 in this way improves retention of the tracking component 112 within the housing 110 because, after the material has set or cured, a matrix that includes the tracking component 112 and the material cannot fit through the relatively smaller footprint of the opening 115. In some embodiments, the wall feature is a notch or indentation. For example, one or more of the walls of the housing 110 can be formed to include a notch or indentation of various shapes that similarly results in a portion of the recess having a footprint that is larger than the opening 115 of the recess 114. The notch or indentation may be, for example, a pocket, groove, and the like that is formed into one or more of the walls. In some embodiments, the wall feature may be a protrusion that extends from the one or more of the walls of the housing 110 into the recess 114. The protrusion that extends into the recess 114 creates an obstruction that prevents the matrix comprising the material and the tracking component 112 from easily separating from the housing 110.

Figure 4:
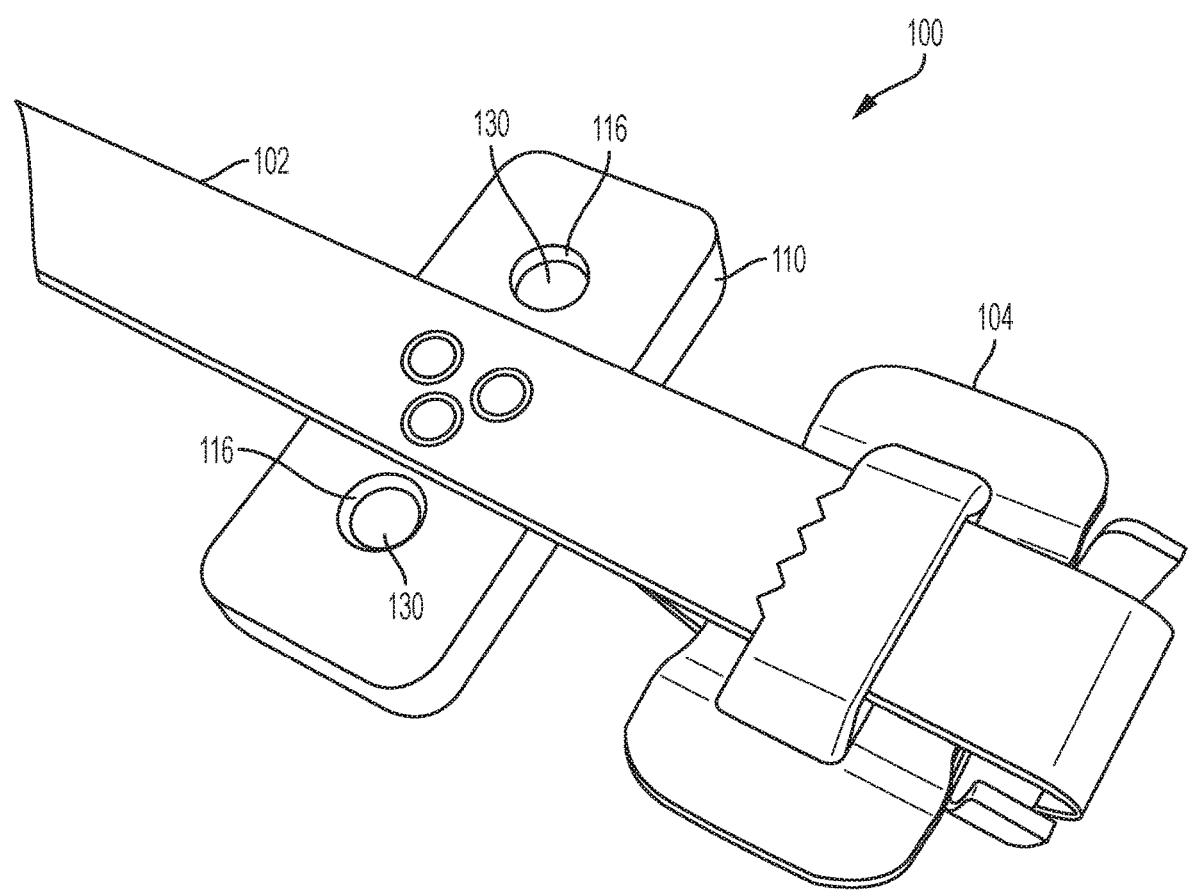
FIG. 4 is a partial perspective view of a top of a side of the tracking device of FIG. 1.

Referring now to FIG. 4, a partial perspective view of a top side of the tracking device 100 is shown. In a typical embodiment, the housing 110 includes one or more holes 116 that pass through the housing 110. As shown in FIG. 4, the housing 110 includes two holes 116 that are spaced far enough apart so that the flexible band 102 may pass between the two holes 116. The holes 116 facilitate the passage of electromagnetic radiation into and out of the housing 110 to improve interaction between a tracking-component reader and the tracking component 112. A ground element 130 positioned on a back side of the tracking component 112 is visible through the holes 116. In a typical embodiment, the ground element 130 contacts the housing 110 to facilitate conduction of electrical signals between the tracking component 112 and the housing 110, which enables the housing 110 and other conductive components in contact with the housing 110 to act as antennas for the tracking component 112. In some embodiments, either or both of the two holes 116 may be positioned underneath the flexible band 102. In such an embodiment, a hole may be formed through the flexible band 102 to provide a through-hole that passes through the flexible band 102 and through the housing 110 (e.g., see FIG. 14).

Figure 5:
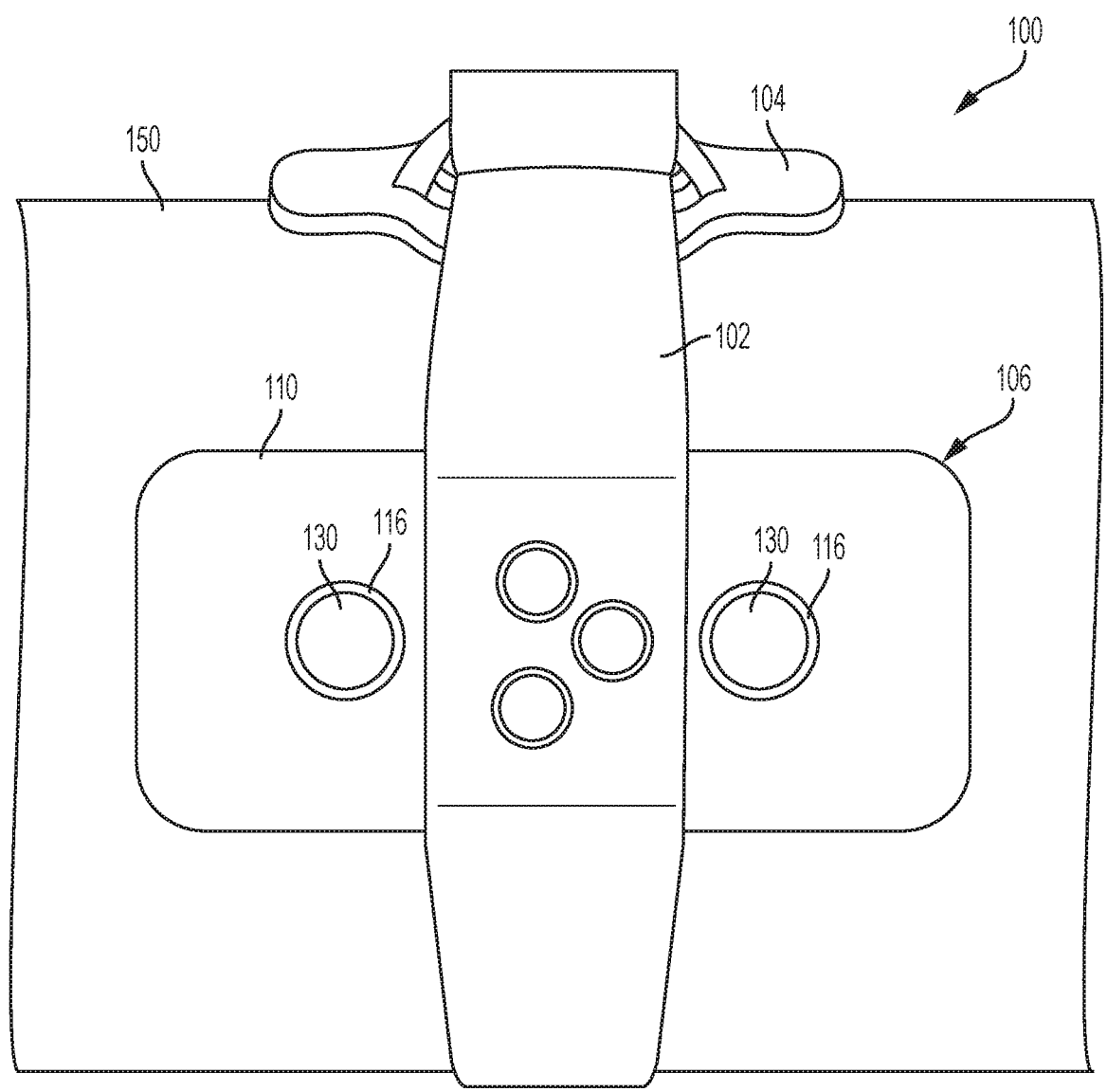
FIG. 5 is a partial top view of the tracking device installed on a pipe.

Referring now to FIG. 5, a partial top view of the tracking device 100 is shown installed on a pipe 150. When installed on the pipe 150, the length of the housing 110 is shown oriented perpendicular to the circumference of the flexible band 102 and parallel to a length of the pipe 150. The housing 110 is also shown attached to an inside portion of the flexible band 102 so that the carrier 106 is held against the pipe 150 to further secure the carrier 106 to the pipe 150. Securing the carrier 106 to the pipe 150 in this way reduces a likelihood that the carrier 106 will separate from the pipe 150. For example, in the event that the spot welds that secure the housing 110 to the flexible band 102 fail, the carrier 106 is nevertheless held to the pipe 150 by virtue of the carrier 106 being sandwiched between the pipe 150 and the flexible band 102. With the carrier 106 oriented as shown in FIG. 5, the antenna element 118 (best seen in FIG. 3) of the tracking component 112 faces the pipe 150 and a ground element 130 of the tracking component 112 faces out (i.e., the ground element 130 can be seen through the holes 116).

Figure 6:
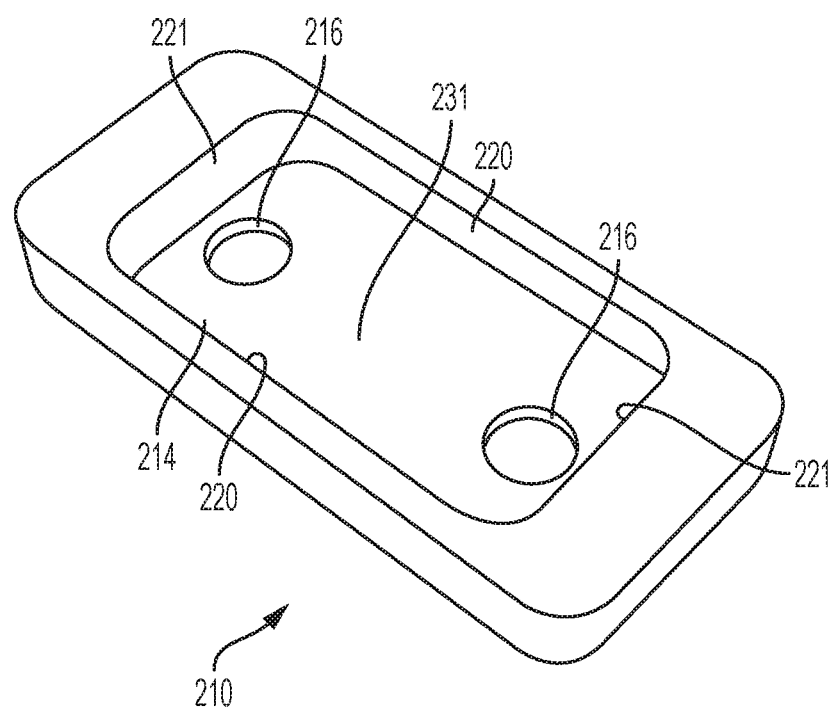
FIG. 6 is a top perspective view of a housing.

Referring now to FIG. 6, a top perspective view of a front side of a housing 210 is shown. The housing 210, which is similar to the housing 110 discussed above, includes a recess 214 and one or more holes 216. In some embodiments, the housing 210 may be used as a tracking device without being secured to a flexible band. In such an embodiment, the housing 210 may be secured to a component in various ways. For example, the housing 210 may be attached to the component via welding, fasteners, adhesives, and the like.

The recess 214 may be formed in the housing 210 by various machining processes or may be formed by casting the housing 210. Forming the recess 214 into the housing 210 creates a pair of walls 220, a pair of walls 221, and a bottom surface 231. In some embodiments, one or more of the pair of walls 220 and 221 are formed with a dovetail shape described above. In some embodiments, one or more of the walls of the housing 210 can be formed to include, for example, a notch or indentation of various shapes that results in the epoxy resin having a footprint that is larger than the opening of the recess 214.

Figure 7:
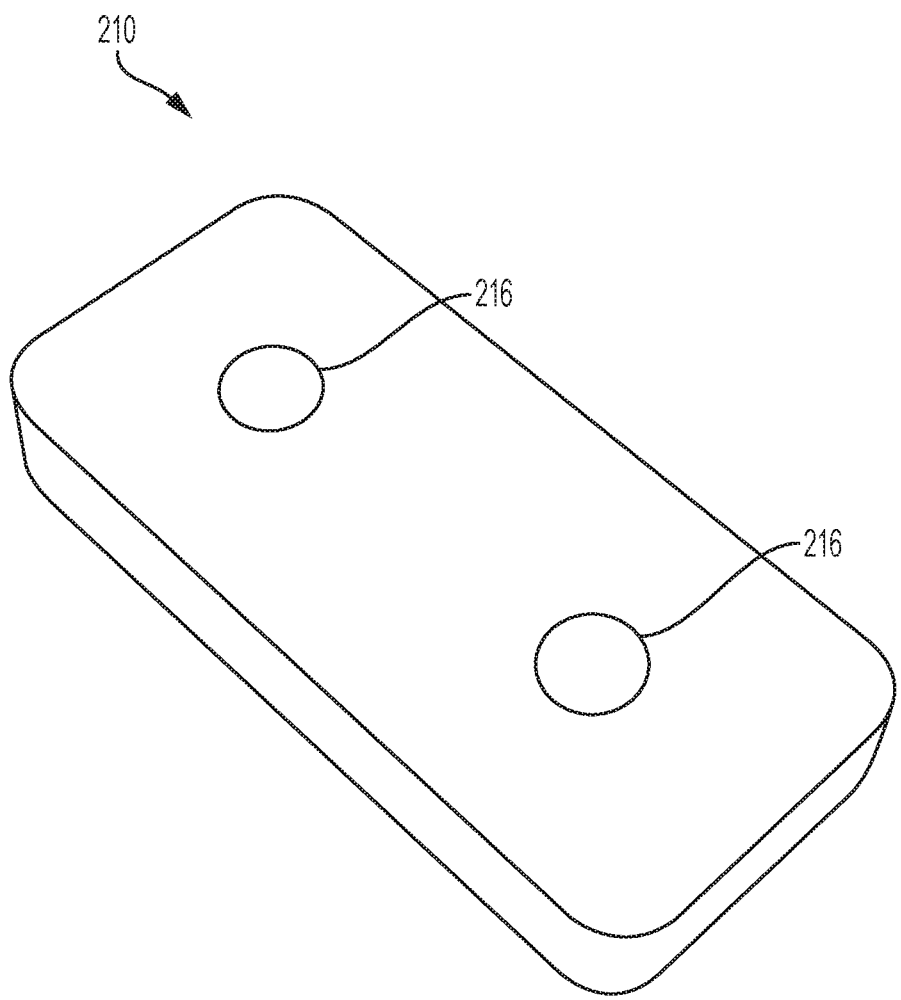
FIG. 7 is a bottom perspective view of the housing.

Referring now to FIG. 7, a bottom perspective view of the housing 210 is shown. As shown FIG. 7, the holes 216 pass through a bottom side of the housing 210 to enhance communication of electromagnetic signals into and out of the housing 210. More or fewer holes 216 could be included as desired based on various design considerations. For example, an RFID tag housed within the housing 210 may include one or more antenna elements, such as, for example, antenna element 118. In some embodiments, the housing 210 may include one or more holes 216 positioned over each antenna element. A size, number, and location of the holes 216 may be varied as desired. While the holes 216 are shown as circular, holes of other shapes may be used as desired. For example, the holes 216 may instead take the form of one or more slots. In some embodiments, a single slot that extends above each antenna element of a tracking component may be formed into the housing 210.

Figure 8:
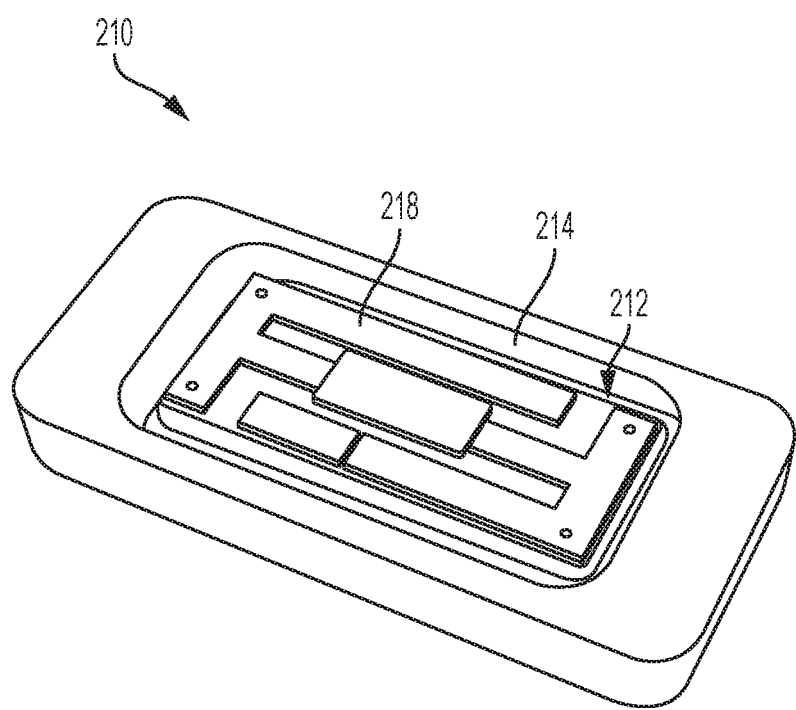
FIG. 8 is a top perspective view of the housing with an RFID tag disposed within the housing.
Figure 9:
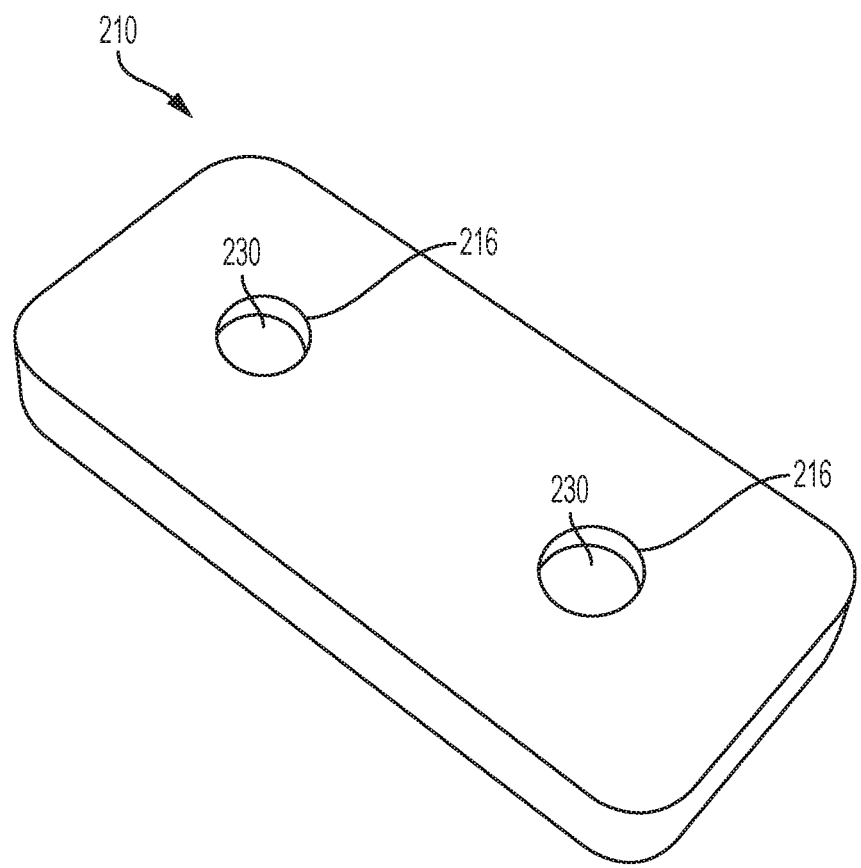
FIG. 9 is a bottom perspective view of the housing with the RFID tag disposed within the housing.

Referring now to FIG. 8, a top perspective view of the housing 210 with a tracking component 212 inserted into the recess 214 is shown. The tracking component 212 includes an antenna element 218 disposed on a top side of the tracking component 212. As shown in FIG. 8, the antenna element 218 faces out of the recess 214. Orienting the tracking component 212 with the antenna element 218 facing out of the recess 214 prevents circuitry of the tracking component 212 from becoming grounded on a surface of the housing 210, which would render the tracking component 212 inoperable. In a typical embodiment, prior to filling the housing 210 with a material, such as, for example, an epoxy resin, the tracking component 212 is adhered to the bottom surface 231 of the housing 210. In a typical embodiment, the tracking component 212 may be adhered to the bottom surface 231 by applying an adhesive to a ground element 230 (the ground element 230 is best seen in FIG. 9) located on a bottom side of the tracking component 212. The adhesive ensures that the tracking component 212 does not float or move within housing 210 as the material fills the recess 214. If, after the material sets, the ground element 230 does not maintain contact with the housing 210, the tracking component 212 may not operate properly. Various adhesives, such as, for example, a 300 LSE manufactured by 3M, may be used to adhere the tracking component 212 to the housing 210.

Referring now to FIG. 9, a bottom perspective view of the housing 210 with the tracking component 212 installed is shown. With the tracking component 212 installed, the ground element 230 of the tracking component 212 can be seen through the holes 216. In a typical embodiment, the ground element 230 of the tracking component 212 contacts the housing 210, which enables the tracking component 212 to use the housing 210 and other conductive components in contact with the housing 210 as additional antenna elements to improve communication between the tracking component 212 and an RFID reader. For example, in the embodiment of FIGS. 1A and 1B, the flexible band 102 may also act as an antenna.

Figure 10A:
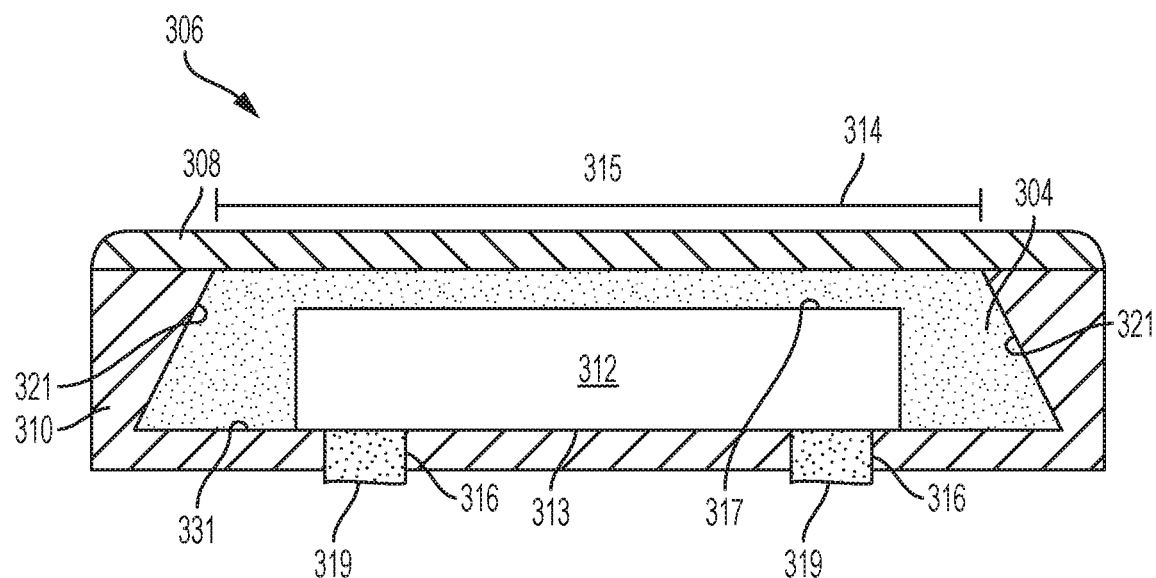
FIGS. 10A and 10B are cross-sectional views of the housing.
Figure 10B:
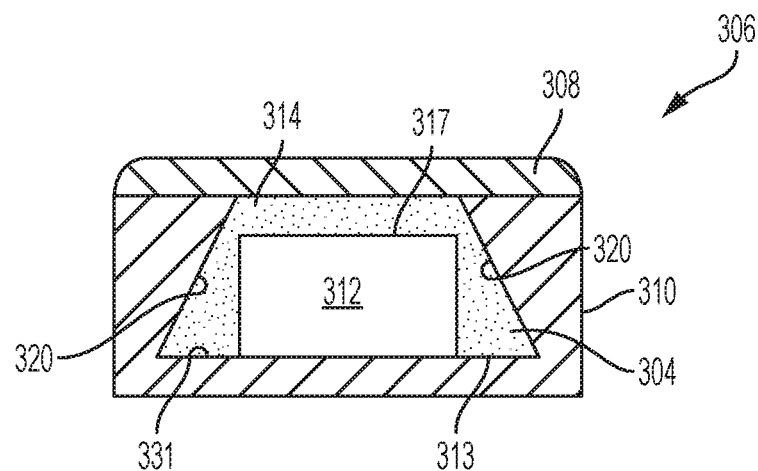

Referring now to FIGS. 10A and 10B, FIG. 10A is a cross-sectional view about a length of a carrier 306 and FIG. 10B is a cross-sectional view about a width of the carrier 306. In a typical embodiment, the carrier 306 includes a cover 308 and a housing 310. The housing 310 is similar to the housings 110 and 210 discussed above. The housing 310 includes a recess 314 that is formed into the housing 310 and holes 316. As shown in FIG. 10A, each of the holes 316 contains a plug 319 that is made of a filler material and is adapted to prevent a material 304 from leaking out of the recess 314 before the material 304 has cured or set. The recess 314 forms a pair of sloped walls 320 (see FIG. 10A), a pair of sloped walls 321 (see FIG. 10B), and a bottom surface 331.

In a typical embodiment, the recess 314 is adapted to accommodate a tracking component 312 such as, for example, an RFID tag. In a typical embodiment, the tracking component 312 is positioned within the housing 310 so that at least a portion of a bottom side 313 of the tracking component 312 contacts the bottom surface 331. Ensuring contact between the bottom side 313 and the bottom surface 331 allows an electrical signal to be conducted between the tracking component 312 and the housing 310, which permits the housing 310 to act as an antenna element.

In the embodiment shown in FIGS. 10A and 10B, the tracking component 312 is immersed within a material 304. The material 304 secures the tracking component 312 within the housing 310. In a typical embodiment, the material 304 is an epoxy resin, but other materials that harden or cure may be used as desired. In a typical embodiment, the recess 314 has a depth that is greater than a thickness of the tracking component 312 so that a top surface 317 of the tracking component 312 is completely covered by the material 304. Covering the top surface 317 of the tracking component 312 with the material 304 helps secure the tracking component 312 within the recess 314 and also helps protect the tracking component 312 from the elements. The cover 308 serves as an additional layer of protection that protects the tracking component 312 from impacts, vibrations, and the elements.

In a typical embodiment, the housing 310 also includes holes 316. The holes 316 are similar to the holes 116 and 216 discussed above. In some embodiments, the carrier 306 includes plugs 319 that are disposed within the holes 316. The plugs 319 are adapted to seal the holes 316 to prevent the material 304 from leaking out of the housing 310 while the material 304 is curing or setting. Various materials may be used to form the plugs 319. In a typical embodiment, the plugs 319 may be a sealant that is applied to the holes 316 prior to filling the housing 310 with the material 304. Various types of sealant may be used. For example, the sealant could be a wax, a glue, a putty, a resin, a paste, and the like. In other embodiments, the plugs 319 may be replaced with an adhesive cover, similar to the cover 308, that is adhered to a bottom face of the housing 310 that blocks the one or more holes 316. In some embodiments, the adhesive cover may be applied to the carrier 306 with an adhesive. The adhesive cover may be a piece of tape or could be similar to the cover 308. If desired, the adhesive cover may be removed from the carrier 306 prior to installation of the carrier 306 onto a component.

As shown in FIGS. 10A and 10B, the housing 310 includes the pair of sloped walls 320 and 321. The pairs of sloped walls 320 and 321 are adapted to help retain the tracking component 312 within the housing 310. As shown in FIGS. 10A and 10B, a slope of each of the pair of sloped walls 320 and 321 results in the bottom surface 331 having a larger footprint than an opening 315 of the recess 314. Thus, when the material 304 has cured, a resulting matrix that includes the tracking component 312 and the material 304 cannot be removed from the recess 314. In some embodiments, only one wall of the pair of sloped walls 320 and 321 may be sloped. Reducing a number of walls that are sloped may be desirable as it may reduce the complexity of manufacturing the housing 310. In some embodiments, walls of the housing 310 may include various other features that result in the material 304 having a footprint that is larger than the opening 315 of the recess 314. For example, one or more protrusions, grooves, bores, and the like may be formed into one or more walls of the recess 314. In such an embodiment, as the material 304 fills the recess 314, the material 304 will flow into the one or more protrusions, grooves, or bores. Upon curing or setting, the material 304 will have a footprint that is larger than the opening 315.

Referring now to FIGS. 11A and 11B, top and bottom views, respectively, of a tracking device 400 are shown. The tracking device 400 includes a flexible band 402, a clasp 404, and a carrier 406. In a typical embodiment, the carrier 406 includes a cover 408 and a housing 410. The tracking device 400 and the components thereof are similar to the tracking device 100. However, the tracking device 400 differs from the tracking device 100 in a few ways. For example, as shown in the FIGS. 11A and 11B, the carrier 406 is oriented with its long side parallel to a length of the flexible band 402 in order to reduce a width of the tracking device 400. The tracking device 400 also differs from the tracking device 100 because the tracking device 400 includes a surface treatment or coating 417 that has been applied to the housing 410 and a portion of the flexible band 402. The coating 417 reduces reflectivity of the tracking device 400 to improve readability of a tracking component 412 disposed within the housing 410 by an RFID reader.

The housing 410 is similar to the housings 110, 210, and 310 discussed above and has a generally rectangular shape, with one side longer than the other. The housing 410 includes a recess 414 that is adapted to house a tracking component, such as, for example, an RFID tag. In a typical embodiment, the housing 410 is attached to the flexible band 402 so that the long side of the housing 410 is oriented parallel to a length of the flexible band 402 and is further oriented on the flexible band 402 so that the housing 410 is positioned between the flexible band 402 and a component to which the tracking device 400 is secured. The housing 410 may be secured to the flexible band 402 in various ways, such as, for example, spot welding, adhesives, fasteners, and the like. Orientating the carrier 406 to be parallel to the length of the flexible band 402 creates a narrower profile for the tracking device 400 when compared to the tracking device 100. The narrower profile allows the tracking device 400 to be secured to components where a narrow profile is needed. Positioning the housing 410 between the flexible band 102 and the component to which the tracking device 400 is attached pins the carrier 406 against the component. Pinning the carrier 406 against the component helps retain the carrier 406 against the component—even if a connection between the carrier 406 and the flexible band 402 were to fail.

Figure 12:
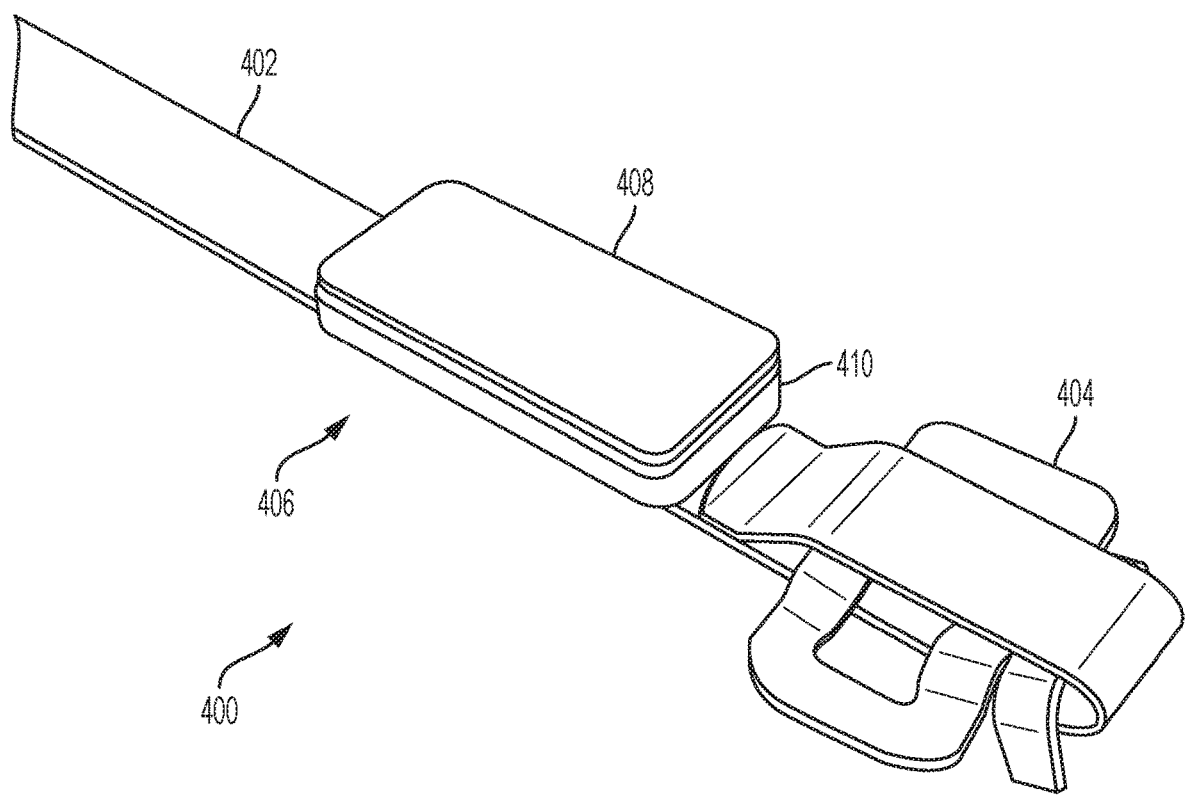
FIG. 12 is a partial bottom perspective view of the tracking device of FIGS. 11A and 11B with a cover in place.
Figure 13:
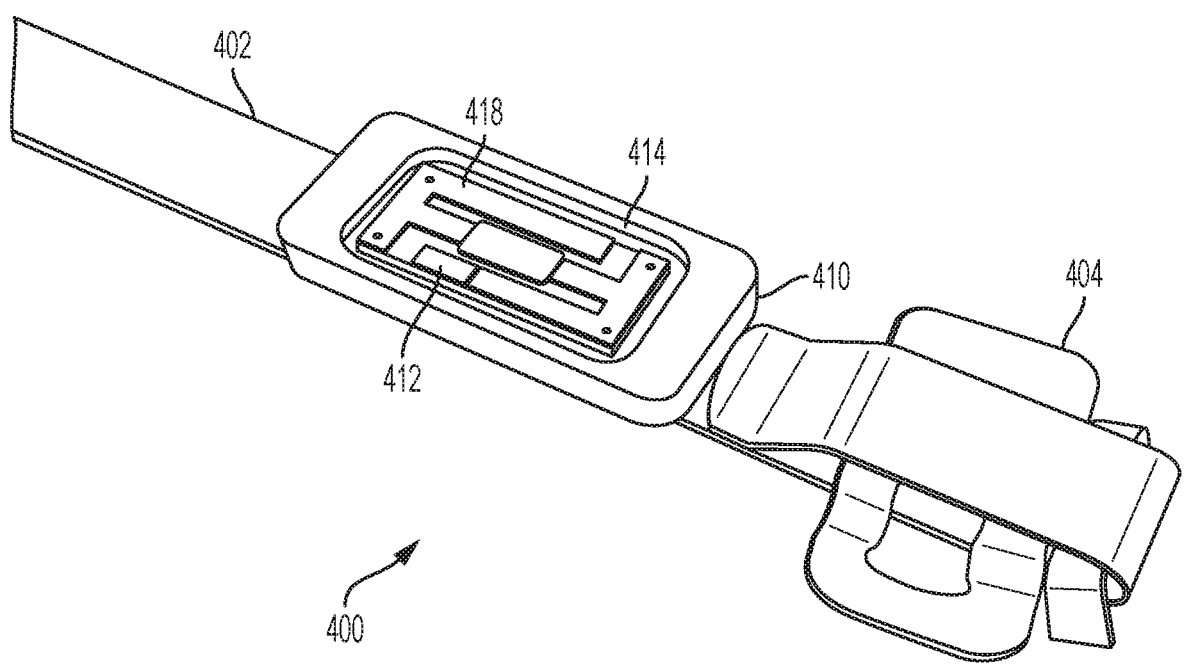
FIG. 13 is a partial bottom perspective view of the tracking device of FIGS. 11A and 11B with the cover removed.

Referring now to FIGS. 12 and 13, partial bottom views of the tracking device 400 are shown. FIG. 12 shows the device 400 with the cover 408 installed and FIG. 13 shows the tracking device 400 with the cover 408 removed. As shown in FIGS. 12-13, the carrier 406 is attached to the flexible band 402 in close proximity to the clasp 404. In other embodiments, the carrier 406 may be secured on the flexible band 402 at any point along the length of the flexible band 402 as desired. As shown in FIG. 13, the tracking component 412 is shown disposed within the recess 414 with an antenna element 418 facing out of the recess 414. Orienting the tracking component 412 with the antenna element 418 facing out of the recess 414 prevents circuitry of the tracking component 412 from becoming grounded on a surface of the housing 410, which would render the tracking component 412 inoperable.

Figure 14:
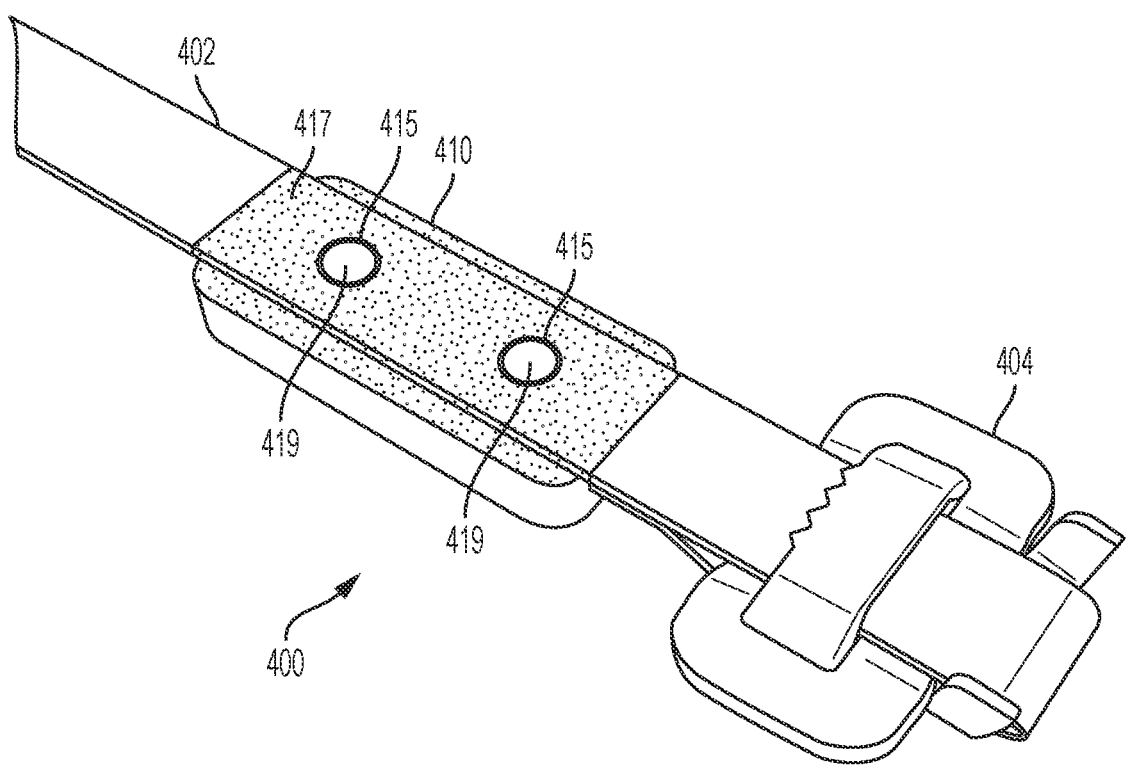
FIG. 14 is a partial top perspective view of the tracking device of FIGS. 11A and 11B.

Referring now to FIG. 14, a partial top view of the tracking device 400 is shown. In the embodiment of FIG. 14, the flexible band 402 includes holes 415 that align with holes formed through the housing 410. The holes formed through the housing 410 are not explicitly shown, but are similar to the holes 116, 216, and 316 discussed above). Each of the holes 415 and the holes formed through the housing 410 facilitates passage of electromagnetic radiation into and out of the housing 110 to improve readability of the tracking component 412 by a tracking-component reader. The embodiment shown in FIG. 14 also includes the coating 417 that has been applied to the flexible band 402 and the housing 410. The coating 417 reduces a glare/reflectivity of a surface of the flexible band 402 and the housing 410. The reduction of the glare/reflectivity improves the tracking-component reader's ability to read the tracking component 412. The coating 417 can be a paint, such as, for example, a black or dull paint, a tape or adhesive product, a polymer, or other material that results in dark or dull finish. In some embodiments, other treatments can be applied to either or both of the flexible band 402 and the housing 410. For example, other treatments include abrading or scuffing the surface of the either or both the flexible band 402 and the housing 410. In some embodiments, no coating or treatment is applied to the tracking device 400. It will be appreciated by those having skill in the art that the coating 417 could be applied to one or more components of the tracking devices 100 and 200 and the carrier 306 as desired.

Still referring to FIG. 14, a plug 419 may be placed into each of the holes formed through the housing 410 to prevent or limit leakage of a material, such as, for example, an epoxy resin, from the holes 116 while the material is setting or curing. The plugs 419 are similar to the plugs 319 described above. As shown in FIG. 14, the holes formed through the housing 410 have been filled with a glue. The glue may be, for example, a hot-melt glue that is injected into the holes formed through the housing 410.

Figure 15:
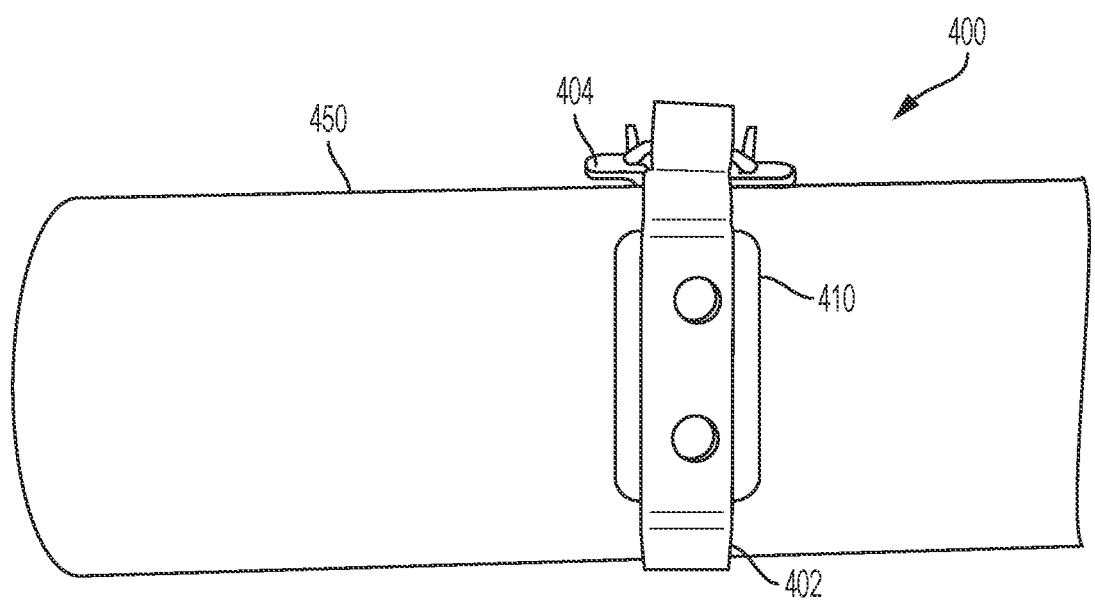
FIG. 15 is a partial top view of the tracking device of FIGS. 11A and 11B installed on a pipe.

Referring now to FIG. 15, a partial top view of the tracking device 400 installed on a pipe 450 is shown. When installed on the pipe 450, the length of the housing 410 is shown oriented parallel to the flexible band 402 and perpendicular to a length of the pipe 450. The housing 410 is also shown attached to an inside portion of the flexible band 402 so that the housing 410 is held against the pipe 450 to further secure it to the pipe 450. Securing the housing 410 to the pipe 450 in this way reduces a likelihood that the housing 410 will separate from the pipe 450. For example, in the event that the spot welds that secure the housing 410 to the flexible band 402 fail, the housing 410 is nevertheless held to the pipe 450 by virtue of the housing 410 being pinned between the pipe 450 and the flexible band 402. FIG. 15 also shows the housing 410 oriented with the cover 408 facing the pipe 450. With the housing 410 oriented as shown in FIG. 15, the tracking component 412 is oriented with the antenna element 418 facing the pipe 450 and a ground element of the tracking component 412 facing out, similar to the tracking device 100. FIG. 15 also shows that the tracking device 400 has a relatively narrow footprint compared to the tracking device 100 when installed on a pipe.

In addition to the embodiments disclosed above, a tracker may include a carrier made of a non-metallic material (e.g., polymers, ceramics, composites, and the like). If a non-metallic carrier is used, additional components may be included to ensure that there is contact between the grounding element of the RFID tag and the flexible band to enable the flexible band to act as an external antenna. Contact between the grounding element and the flexible band may be accomplished in various ways. In some embodiments, a metallic contact can be placed into the non-metallic carrier such that a first end of the metallic contact touches the ground element of the RFID tag and a second end of the metallic contact touches the flexible band. The metallic contact could be, for example, a rivet, a wire, a tab, and the like.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A carrier comprising:
   a housing for securing an electronic component, the housing comprising:
   a recess formed into a face of the housing, wherein a periphery of the recess is substantially surrounded by a wall; and
   a first hole formed through a bottom surface of the housing positioned to overlap at least a portion of an antenna element of the electronic component and a second hole formed through the bottom surface of the recess, the first and second holes being configured to enable transmission of electromagnetic radiation through the housing to and from the electronic component, and wherein at least a portion of the electronic component is positioned within the housing to contact the housing to facilitate conduction of electrical signals between the electronic component and the housing to enable the housing to act as an antenna for the electronic component.

2. The carrier of claim 1, wherein at least a portion of the wall is angled so that a bottom surface of the recess has a footprint that is larger than an opening of the recess.

3. The carrier of claim 1, wherein a protrusion is formed into the wall of the recess.

4. The carrier of claim 1, wherein the first hole is a slot that is positioned to overlap the antenna element of the electronic component when the electronic component is positioned with the recess.

5. The carrier of claim 1, comprising a plug positioned to block at least one of the first and second holes formed through the bottom surface of the recess.

6. The carrier of claim 5, wherein the plug is selected from the group consisting of a wax, a glue, and a polymer.

7. The carrier of claim 5, wherein the plug is an adhesive cover that is attached to a bottom face of the housing.

8. The carrier of claim 1, comprising a surface treatment that is applied to at least a portion of the housing.

9. The carrier of claim 8, wherein the surface treatment is a dark or dull coating.

10. The carrier of claim 8, wherein the surface treatment is a scuffing or abrasion.

11. The carrier of claim 1, comprising a cover adapted to enclose an opening of the recess.

12. The carrier of claim 1, further comprising an elongated band configured for securing the carrier to an item to be monitored.

* * * * *